(12) United States Patent
Tanno et al.

(10) Patent No.: US 11,427,038 B2
(45) Date of Patent: Aug. 30, 2022

(54) PNEUMATIC TIRE (71) Applicant: The Yokohama Rubber Co., LTD., Tokyo (JP)

(72) Inventors: Atsushi Tanno, Hiratsuka (JP); Yousuke Sakamoto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 558 days.

(21) Appl. No.: 15/038,021

(22) PCT Filed: Nov. 21, 2014

(86) PCT No.: PCT/JP2014/080948
§ 371 (c)(1),
(2) Date: May 19, 2016

(87) PCT Pub. No.: WO2015/076382
PCT Pub. Date: May 28, 2015

(65) Prior Publication Data
US 2016/0297261 A1 Oct. 13, 2016

(30) Foreign Application Priority Data
Nov. 21, 2013 (JP) .............................. JP2013-241359

(51) Int. Cl.
*B60C 19/00* (2006.01)
*B60C 1/00* (2006.01)
(Continued)

(52) U.S. Cl.
CPC .............. *B60C 19/002* (2013.01); *B32B 5/18* (2013.01); *B32B 7/12* (2013.01); *B60C 1/00* (2013.01);
(Continued)

(58) Field of Classification Search
CPC .......... B32B 2307/10; B32B 2307/536; B32B 2405/00; B32B 2605/00; B32B 5/18;
(Continued)

(56) References Cited

U.S. PATENT DOCUMENTS

2003/0020320 A1  1/2003  Yukawa
2003/0188817 A1  10/2003 Yukawa
(Continued)

FOREIGN PATENT DOCUMENTS

CN      1894113       4/2007
CN      101987564     3/2011
(Continued)

OTHER PUBLICATIONS

JP2011020479A-Machine Translation (Year: 2011).*
(Continued)

*Primary Examiner* — Yunju Kim
(74) *Attorney, Agent, or Firm* — Thorpe North & Western (57) ABSTRACT

A pneumatic tire of the present technology is a pneumatic tire provided with a tread portion, side wall portions and bead portions, a plurality of circumferential grooves extending in the tire circumferential direction being provided in the tread portion, and a belt-shaped sound-absorbing member being bonded via an adhesive layer to the tire inner surface in a region corresponding to the tread portion along the tire circumferential direction, wherein the width W of the sound-absorbing member is from 70% to 95% of the tire ground contact width TCW, and the total width of the circumferential grooves included in the region in the tire width direction
(Continued)

in which the sound-absorbing member is disposed is from 25% to 40% of the width W of the sound-absorbing member.

12 Claims, 4 Drawing Sheets

(51) Int. Cl.
| | | |
|---|---|---|
| *B60C 5/00* | (2006.01) | |
| *B60C 9/02* | (2006.01) | |
| *B60C 9/18* | (2006.01) | |
| *B60C 11/03* | (2006.01) | |
| *B60C 13/00* | (2006.01) | |
| *B60C 15/00* | (2006.01) | |
| *B32B 5/18* | (2006.01) | |
| *B32B 7/12* | (2006.01) | |

(52) U.S. Cl.
CPC .................. *B60C 5/00* (2013.01); *B60C 9/02* (2013.01); *B60C 9/18* (2013.01); *B60C 11/03* (2013.01); *B60C 11/0332* (2013.01); *B60C 13/00* (2013.01); *B60C 15/00* (2013.01); *B60C 15/0045* (2013.01); *B32B 2307/10* (2013.01); *B32B 2307/536* (2013.01); *B32B 2405/00* (2013.01); *B32B 2605/00* (2013.01); *B60C 2011/0341* (2013.01); *B60C 2011/0353* (2013.01)

(58) Field of Classification Search
CPC ....... B32B 7/12; B60C 11/03; B60C 11/0332; B60C 13/00; B60C 15/00; B60C 15/0045; B60C 19/002; B60C 1/00; B60C 2011/0341; B60C 2011/0353; B60C 5/00; B60C 9/02; B60C 9/18
USPC ........................................................ 152/157
See application file for complete search history.

(56) References Cited

U.S. PATENT DOCUMENTS

| | | |
|---|---|---|
| 2004/0238094 A1 | 12/2004 | Kajita |
| 2005/0205183 A1 | 9/2005 | Yukawa |
| 2007/0074798 A1 | 4/2007 | Tanno et al. |
| 2007/0089824 A1 | 4/2007 | Yukawa |
| 2007/0119533 A1 | 5/2007 | Yukawa |
| 2009/0308519 A1* | 12/2009 | Ishihara .................... B60C 5/00 152/548 |
| 2010/0108224 A1 | 5/2010 | Yukawa |
| 2010/0212795 A1 | 8/2010 | Murata |
| 2010/0270101 A1 | 10/2010 | Yukawa |
| 2011/0024012 A1 | 2/2011 | Iwai |

FOREIGN PATENT DOCUMENTS

| | | |
|---|---|---|
| JP | 2002-067608 | 3/2002 |
| JP | 2003-063208 | 3/2003 |
| JP | 2004-352174 | 12/2004 |
| JP | 2005-138760 | 6/2005 |
| JP | 2007-112395 | 5/2007 |
| JP | 2008-080969 | 4/2008 |
| JP | 2010-047134 | 3/2010 |
| JP | 2010-173573 | 8/2010 |
| JP | 2011-020479 | 2/2011 |
| WO | WO 2005/058616 | 6/2005 |
| WO | WO 2009/044727 | 4/2009 |

OTHER PUBLICATIONS

No. 5000NS (Nitto Denko) _ Misumi (Year: 2022).*
International Search Report for International Application No. PCT/JP2014/080948 dated Feb. 24, 2015, 4 ages, Japan.

* cited by examiner

PNEUMATIC TIRE

TECHNICAL FIELD

The present technology relates to a pneumatic tire comprising a belt-shaped sound-absorbing member bonded to a tire inner surface in a region corresponding to a tread portion, and, more specifically, to a pneumatic tire allowing for ensured satisfactory wet performance and reduced air column resonance caused by circumferential grooves.

BACKGROUND ART

In pneumatic tires, cavernous resonance caused by the vibration of air that the tire is filled with is one cause of noise being generated. When a tire is rolled, uneven road surfaces cause a tread portion to vibrate. The vibrations of the tread portion cause the air inside the tire to vibrate which causes cavernous resonance to be generated.

One proposed method for reducing the noise produced by this phenomenon of cavernous resonance is to provide a sound-absorbing member within the cavity formed between the tire and the rim of the wheel. More specifically, a belt-shaped sound-absorbing member is bonded to the tire inner surface in a region corresponding to the tread portion (see, for example, Japanese Unexamined Patent Application Publication Nos. 2002-67608A and 2005-138760A).

Meanwhile, circumferential grooves that extend in the tire circumferential direction are formed in the tread portion of a pneumatic tire; such circumferential grooves are one factor that causes the production of air column resonance, which has a frequency (approximately 800 Hz to 1.5 kHz) higher than that of cavernous resonance (approximately 200 Hz to 250 Hz). In particular, increasing the width of the circumferential grooves in order to improve wet performance also increases the air column resonance produced thereby. Reducing the width of the circumferential grooves in order to reduce air column resonance leads to reduced wet performance. There is therefore a demand for reduced air column resonance caused by circumferential grooves while ensuring satisfactory wet performance.

SUMMARY

The present technology provides a pneumatic tire that allows for ensured satisfactory wet performance and reduced air column resonance caused by circumferential grooves.

A pneumatic tire according to the present technology is a pneumatic tire provided with an annular-shaped tread portion extending in a tire circumferential direction, a pair of side wall portions disposed on both sides of the tread portion, and a pair of bead portions disposed on the inner side in the tire radial direction of the side wall portions, a plurality of circumferential grooves that extend in the tire circumferential direction being provided in the tread portion, and a belt-shaped sound-absorbing member being bonded via an adhesive layer to a tire inner surface in a region corresponding to the tread portion along the tire circumferential direction, the tire being characterized in that the sound-absorbing member has a width of 70% to 95% of a ground contact width of the tire, and the circumferential grooves included in the region in the tire width direction in which the sound-absorbing member is disposed have a total width of 25% to 40% of the width of the sound-absorbing member.

The inventors discovered that sound-absorbing member and an adhesive layer used to bond the same provided on a tire inner surface in order to reduce cavernous resonance also contribute in reducing air column resonance caused by the circumferential grooves formed in the tread portion, and arrived at the present invention.

Specifically, the present technology provides a pneumatic tire comprising a belt-shaped sound-absorbing member bonded via an adhesive layer to a tire inner surface in a region corresponding to the tread portion along the tire circumferential direction, wherein the width of the sound-absorbing member is from 70% to 95% of the tire ground contact width, and the total width of the circumferential grooves included in the region in which the sound-absorbing member is disposed in the tire width direction is from 25% to 40% of the width of the sound-absorbing member, thereby making it possible to suppress air column resonance noise caused by the circumferential grooves from being transmitted to the interior of the cavity within the pneumatic tire and resonating, thereby reducing air column resonance noise, while ensuring satisfactory wet performance.

In the present technology, the tire ground contact width is the ground contact width in the tire axial direction as measured when the tire is mounted on a regular rim and inflated to a regular internal pressure, and placed vertically upon a flat surface with a regular load applied thereto. A "regular rim" is a rim defined by a standard for each tire according to a system of standards that includes standards on which tires are based, and refers to a "standard rim" in the case of JATMA, refers to a "design rim" in the case of TRA, and refers to a "measuring rim" in the case of ETRTO. If the tire is a tire for installation on a new vehicle, the genuine wheel upon which the tire is mounted is used. "Regular internal pressure" is the air pressure defined by standards for each tire according to a system of standards that includes standards on which tires are based, and refers to "maximum air pressure" in the case of JATMA, to the maximum value in the table of "TIRE ROAD LIMITS AT VARIOUS COLD INFLATION PRESSURES" in the case of TRA, and to "inflation pressure" in the case of ETRTO. In the case of a tire for installation upon a new vehicle, the air pressure displayed on the vehicle is used. "Regular load" is the load defined by standards for each tire according to a system of standards that includes standards on which tires are based, and refers to "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. If the tire is for use with a passenger vehicle, a load corresponding to 88% of the loads described above is used. If the tire is a tire for installation on a new vehicle, a wheel load calculated by dividing the front and rear axle loads listed on the vehicle inspection certification by two is used.

The width of the circumferential grooves is the width of the grooves in the road contact surface of the tread portion as measured when the tire is mounted on a regular rim and inflated to a regular internal pressure. However, because circumferential grooves having a width of 1.8 mm or less have little effect upon air column resonance, the width of these circumferential grooves is excluded from the total width of the circumferential grooves included in the region in the tire width direction in which the sound-absorbing member is disposed.

The sound-absorbing member is preferably disposed so that all of the circumferential grooves formed in the tread portion are included within the region in the tire width direction in which the sound-absorbing member is disposed.

This allows for the effective reduction of air column resonance caused by the circumferential grooves.

The adhesive layer is preferably double-sided adhesive tape having a thickness of 0.1 mm to 1.2 mm. This allows for the effective reduction of air column resonance caused by the circumferential grooves.

It is preferable that the pneumatic tire of the present technology have a tire ground contact width of 110 mm to 170 mm, and the circumferential grooves disposed in the region in the tire width direction in which the sound-absorbing member is disposed include four main grooves having a width of at least 4 mm. This allows for effective reduction of air column resonance caused by the circumferential grooves while maintaining satisfactory wet performance in a pneumatic tire having a tire ground contact width as described above.

It is preferable that the pneumatic tire of the present technology have a tire ground contact width of 150 mm to 280 mm, and the circumferential grooves disposed in the region in the tire width direction in which the sound-absorbing member is disposed include three main grooves having a width of at least 10 mm and one or two auxiliary grooves having a width of less than 10 mm. This allows for effective reduction of air column resonance caused by the circumferential grooves while maintaining satisfactory wet performance in a pneumatic tire having a tire ground contact width as described above.

The widest circumferential groove out of the circumferential grooves disposed in the region in the tire width direction in which the sound-absorbing member is disposed preferably has a width of at least 15 mm. Forming a circumferential groove having a width of at least 15 mm in the tread portion in this manner allows for enhanced wet performance.

Because the sound-absorbing member is imparted with a comparatively large width in the present technology, shear strain readily occurs in the bonded surface of the sound-absorbing member as the result of deformation of the tread portion. It is therefore necessary to ensure that the sound-absorbing member remains satisfactorily bonded to the tire inner surface. One preferable method of accomplishing this is to dispose the ends in the tire width direction of the sound-absorbing member in regions outside the areas directly beneath the circumferential grooves. Specifically, when a tire changer is used to remove the pneumatic tire from the wheel, the tread portion exhibits pronounced bending at the circumferential grooves; thus, if the ends in the tire width direction of the sound-absorbing member are present in areas directly beneath the circumferential grooves, there is a risk of the ends of the sound-absorbing member debonding from the tire inner surface when deformation of the tread portion occurs. By contrast, disposing the ends in the tire width direction of the sound-absorbing member in regions outside the areas directly beneath the circumferential grooves allows the occurrence of such debonding of the sound-absorbing member to be avoided.

It is preferable that the sound-absorbing member be constituted by a single sound-absorbing member extending in the tire circumferential direction, the member being of uniform thickness at least within a range corresponding to the bonded surface of the sound-absorbing member as seen in a cross-section orthogonal to the longitudinal direction thereof, and having a constant cross-sectional shape along its longitudinal direction. This allows the volume of sound-absorbing member per unit of bonded area to be maximized, thereby yielding superior noise-reducing effects. In addition, a sound-absorbing member having such a shape is easy to machine, thereby reducing manufacturing costs.

It is preferable that the volume of sound-absorbing member be greater than 20% of the volume of the cavity formed within the tire when the tire is mounted on a rim. Increasing the volume of the sound-absorbing member in this way allows superior noise-reducing effects to be obtained, and allows a satisfactory bonded state to be maintained over long periods of time even when a large sound-absorbing member is used. The term "volume of the cavity" refers to the volume of the cavity formed between the tire and the rim when the tire is mounted on a regular rim and inflated to a regular internal pressure.

It is preferable that the sound-absorbing member have a hardness of 60 N to 170 N, and a tensile strength of 60 kPa to 180 kPa. Sound-absorbing member having these physical properties will exhibit superior resistance to shear strain caused by the swelling of the tire when being inflated or deformation of the tread portion due to contact with the ground. The hardness of the sound-absorbing member is as measured according to Japanese Industrial Standard JIS-K 6400-2, "Flexible cellular polymeric materials—Physical properties—Part 2: Determination of hardness and stress-strain characteristics in compression", method D (method for calculating force after constant 25% compression for 20 seconds). The tensile strength of the sound-absorbing member is as measured according to JIS-K 6400-5, "Flexible cellular polymeric materials—Physical properties—Part 5: Determination of tensile strength, elongation at break and tear strength".

It is preferable that the adhesive layer be constituted by double-sided adhesive tape having a peel adhesive force in a range from 8 N/20 mm to 40 N/20 mm. This facilitates the processes of bonding the sound-absorbing member and removing the member when the tire is being disposed of while maintaining satisfactory anchoring strength on the part of the sound-absorbing member. The peel adhesive force of the double-sided adhesive tape is as measured according to JIS-Z 0237. Specifically, a double-sided adhesive sheet is bonded to a piece of PET film having a thickness of 25 μm to create a backing. The adhesive sheet with backing is cut to a 20 mm×20 mm square to create a test sample. The removable liner is peeled off the test sample, and the exposed adhesive surface is bonded to a piece of stainless steel (SUS: B304; surface finish: BA) sheet acting as a substrate using a 2-kg reciprocating roller. This arrangement is kept in a 23° C., 50% relative humidity environment for 30 minutes, after which a tensile tester is used to measure the 180° peel adhesive force of the adhesive sheet to the SUS sheet according to JIS-Z 0237 and in a 23° C., 50% relative humidity environment at testing conditions of 180° peel angle and 300 mm/min strain rate.

If a tire structure in which a carcass layer is mounted between the pair of bead portions, a belt layer is disposed to the outer circumferential side of the carcass layer in the tread portion, the carcass layer is folded back from the tire inner side to the tire outer side around bead cores disposed in each of the bead portions, and the folded back portion of the carcass layer extends to a position overlapping the belt layer is adopted in the present technology, it is preferable that the ends in the tire width direction of the sound-absorbing member be disposed at positions at least 5 mm away from the positions of the ends of the carcass layer. Large amounts of heat are generated near the positions of the ends of the carcass layer in the tire structure described above; thus, separating the ends of the sound-absorbing member from the positions of the ends of the carcass layer allows the durability of the pneumatic tire to be improved.

DESCRIPTION OF EMBODIMENTS

Figure 1:
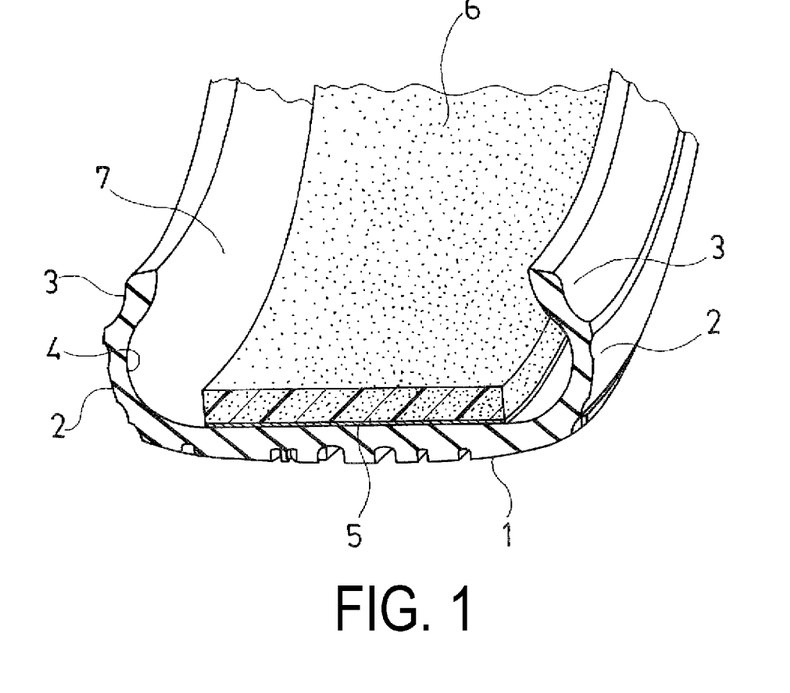
FIG. 1 is a perspective cross-sectional view illustrating a pneumatic tire according to an embodiment of the present technology.

A detailed description of the configuration of the present technology is given below, with reference to the accompanying drawings. FIGS. 1 to 5 illustrate a pneumatic tire according to an embodiment of the present technology. In FIG. 1, a pneumatic tire according to the present embodiment is provided with an annular-shaped tread portion 1 that extends in the tire circumferential direction, a pair of side wall portions 2 disposed on both sides of the tread portion 1, and a pair of bead portions 3 disposed on the inner side in a tire radial direction of the side wall portions 2.

Figure 2:
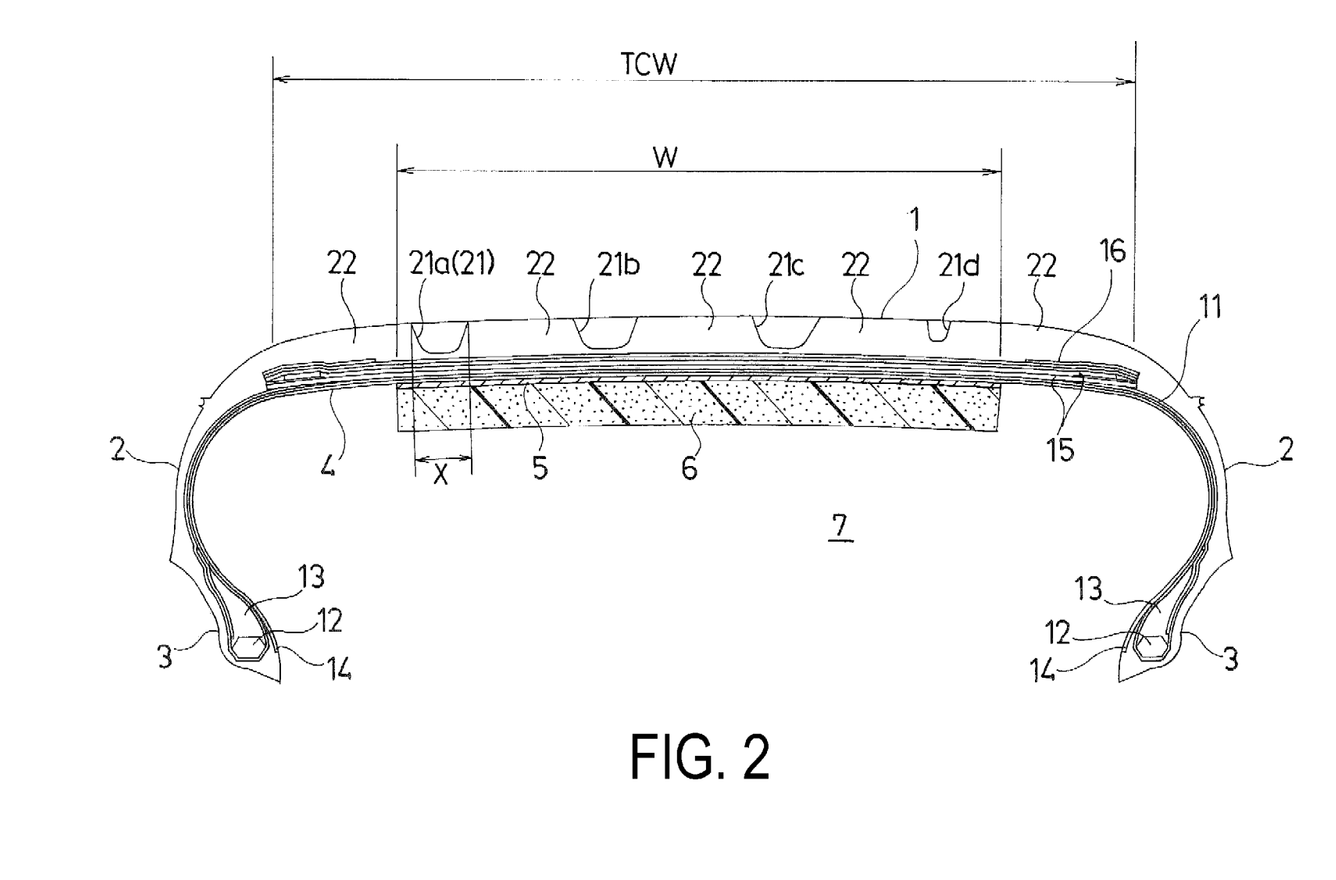
FIG. 2 is a meridian cross-sectional view illustrating a pneumatic tire according to an embodiment of the present technology.

As illustrated in FIG. 2, a carcass layer 11 is mounted between the pair of bead portions 3, 3. The carcass layer 11 includes a plurality of reinforcing cords extending in the tire radial direction, and is folded back around a bead core 12 disposed in each of the bead portions 3 from a tire inner side to a tire outer side. A bead filler 13 having a triangular cross-sectional shape formed from rubber composition is disposed on a periphery of the bead core 12. An inner liner layer 14 is layered to the inward of the carcass layer 11 along a tire inner surface 4.

Meanwhile, a plurality of belt layers 15 is embedded on an outer circumferential side of the carcass layer 11 in the tread portion 1. These belt layers 15 include a plurality of reinforcing cords that incline with respect to the tire circumferential direction, and the reinforcing cords are disposed so that the reinforcing cords of each layer intersect each other. In the belt layers 15, an inclination angle of the reinforcing cords with respect to the tire circumferential direction is set in a range from, for example, 10° to 40°. Steel cords are preferably used as the reinforcing cords of the belt layers 15. For the purpose of enhancing high-speed durability, at least one layer of a belt cover layer 16 formed by arranging reinforcing cords at an angle of, for example, not more than 5° with respect to the tire circumferential direction, is disposed on an outer circumferential side of the belt layers 15. Organic fiber cords of nylon, aramid, or the like are preferably used as the reinforcing cords of the belt cover layer 16.

Figure 3:
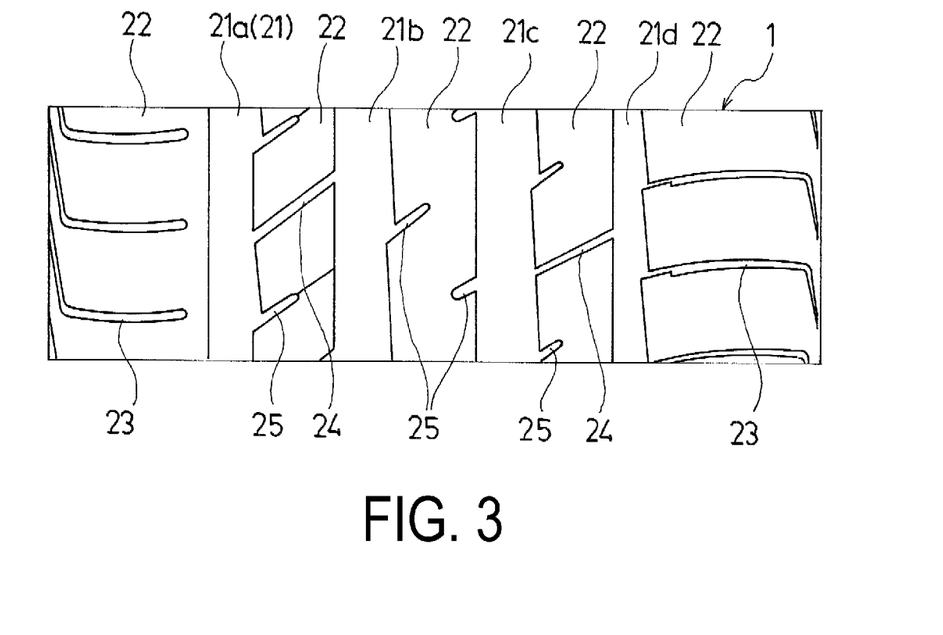
FIG. 3 is a developed view illustrating a tread pattern of a pneumatic tire according to an embodiment of the present technology.

As illustrated in FIG. 3, four main grooves 21 (21a, 21b, 21c, 21d) extending in the tire circumferential direction are formed in the tread portion 1, and five rows of land portions 22 are partitioned by these main grooves 21a to 21d. One of the land portions 22 is disposed at the tire equatorial position (i.e., a central position in a tire width direction). Lug grooves 23 that extend in the tire width direction, inclined grooves 24, and notch grooves 25 are formed in the land portion 22.

In the pneumatic tire described above, a belt-shaped sound-absorbing member 6 is bonded via an adhesive layer 5 to the tire inner surface 4 in a region corresponding to the tread portion 1 along the tire circumferential direction. The sound-absorbing member 6 is constituted by a porous material comprising interconnecting cells, and has specific sound-absorbing properties based on its porous structure. Polyurethane foam is preferably used as the porous material of the sound-absorbing member 6. Meanwhile, a paste-like adhesive or double-sided adhesive tape can be used for the adhesive layer 5.

In the course of providing the circumferential grooves 21a to 21d extending in the tire circumferential direction in the tread portion 1 and bonding the belt-shaped sound-absorbing member 6 via the adhesive layer 5 to the tire inner surface 4 in the region corresponding to the tread portion 1 along the tire circumferential direction, the width W of the sound-absorbing member 6 is set in a range of 70% to 95% of the tire ground contact width TCW, and the total width of the circumferential grooves 21a to 21d included in the region in the tire width direction in which the sound-absorbing member 6 is disposed (i.e., within the width W) is set in a range of 25% to 40% of the width W of the sound-absorbing member 6.

In the pneumatic tire described above, having the width W of the sound-absorbing member 6 be 70% to 95% of the tire ground contact width TCW, and the total width of the circumferential grooves 21a to 21d included in the region in the tire width direction in which the sound-absorbing member 6 is disposed be 25% to 40% of the width W of the sound-absorbing member 6 makes it possible to ensure satisfactory wet performance even if the tire is a low-profile tire, as well as to suppress air column resonance caused by the circumferential grooves 21a to 21d being transmitted to the cavity 7 within the pneumatic tire and resonating, thereby reducing air column resonance.

If the width W of the sound-absorbing member 6 is less than 70% of the tire ground contact width TCW, the cavernous-resonance-reducing effects yielded by the sound-absorbing member 6 will be reduced; conversely, if the width W is greater than 95%, the ends in the tire width direction of the sound-absorbing member 6 will tend to debond due to the effects of the curvature of the tire inner surface 4. The width W of the sound-absorbing member 6 is preferably from 75% to 90% of the tire ground contact width TCW.

If the total width of the circumferential grooves 21a to 21d included in the region in the tire width direction in which the sound-absorbing member 6 is disposed is less than 25% of the width W of the sound-absorbing member 6, wet performance will be reduced; conversely, if the total width is greater than 40%, it will be impossible to sufficiently reduce air column resonance. Such a width is also a factor that negatively affects tire performance in terms of driving stability and the like. The total width of the circumferential grooves 21a to 21d included in the region in the tire width direction in which the sound-absorbing member 6 is disposed is preferably from 27% to 38% of the width W of the sound-absorbing member 6, more preferably from 29% to 37% of the width W of the sound-absorbing member 6, and most preferably from 30% to 36% of the width W of the sound-absorbing member 6.

Figure 4:
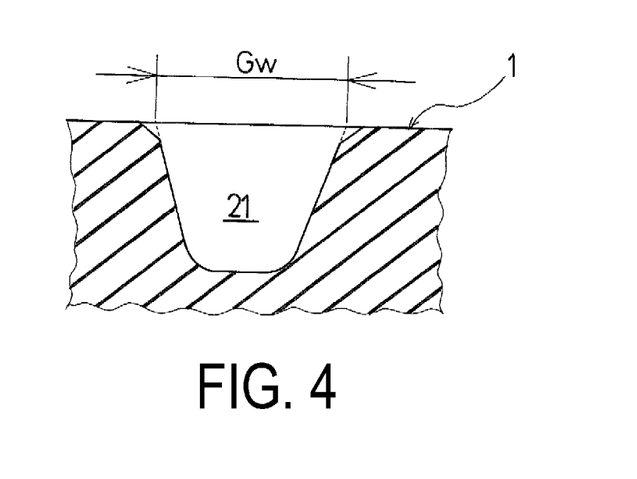
FIG. 4 is a magnified cross-sectional view illustrating a circumferential groove of the pneumatic tire according to the present technology.

As illustrated in FIG. 4, the width Gw of the circumferential groove 21 is the width of the groove in the road contact surface of the tread portion 1; if the circumferential groove 21 comprises chamfered portions, the width Gw is measured based on imaginary points at which extension lines of the walls of the circumferential groove 21 and an extension line of the road contact surface intersect as seen in a tire meridian cross section. If the width Gw of the circumferential groove 21 varies along the tire circumferential direction, the average value thereof is used.

In the pneumatic tire described above, it is possible to dispose additional circumferential grooves at positions set to the outer side in the tire width direction of the region in which the sound-absorbing member 6 is disposed; however, it is preferable to dispose the sound-absorbing member 6 so that all of the circumferential grooves 21 formed in the tread portion 1 are included in the region in the tire width direction in which the sound-absorbing member 6 is disposed. This allows for the effective reduction of air column resonance caused by the circumferential grooves 21.

The adhesive layer 5 is preferably double-sided adhesive tape having a thickness of 0.1 mm to 1.2 mm. Such double-sided adhesive tape contributes to the reduction of air column resonance caused by the circumferential grooves 21. If the thickness of the adhesive layer 5 is less than 0.1 mm, air column resonance reduction effects will be insufficient; conversely, if the thickness exceeds 1.2 mm, the durability of the bond yielded by the adhesive layer 5 will be reduced. The thickness of the adhesive layer 5 is preferably from 0.12 mm to 1.0 mm. The adhesive layer 5 is preferably disposed over the entirety of the bonded surface of the sound-absorbing member 6, but may also be disposed on only part of the bonded surface of the sound-absorbing member 6.

The tire ground contact width TCW of the pneumatic tire described above is within a range from 150 mm to 280 mm; in a pneumatic tire having a tire ground contact width TCW within this range, the circumferential grooves 21 disposed within the region in the tire width direction in which the sound-absorbing member 6 is disposed preferably comprise three main grooves (21a, 21b, 21c) constituted by circumferential grooves 21 having widths of at least 10 mm, and one or two auxiliary grooves (21d) having a width of less than 10 mm. This allows for the effective reduction of air column resonance caused by the circumferential grooves 21 while maintaining satisfactory wet performance.

Figure 6:
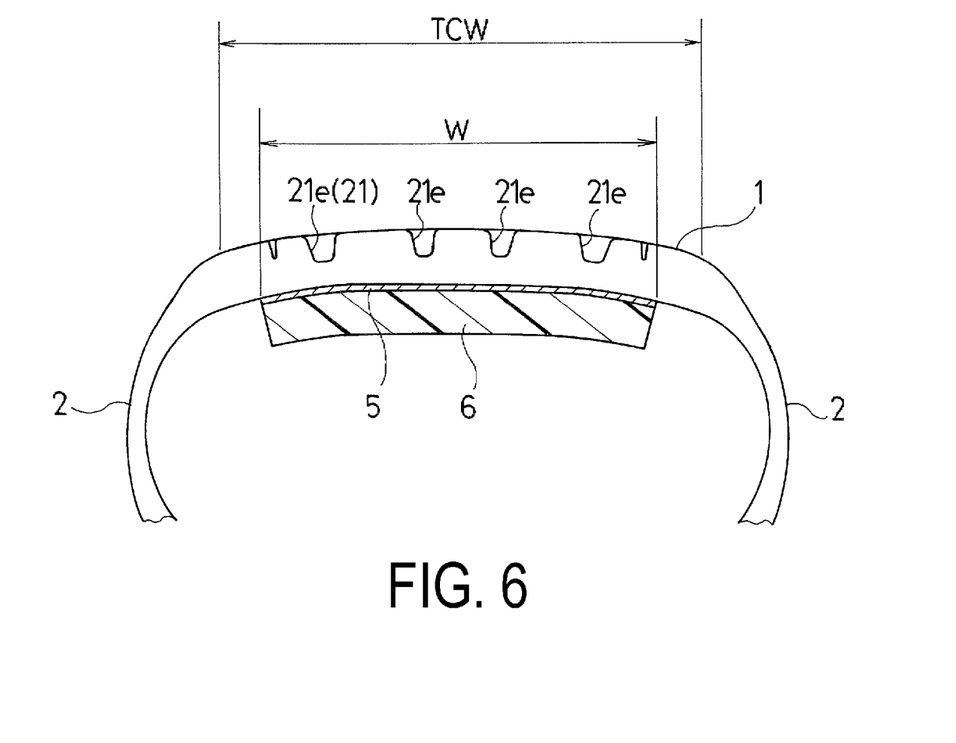
FIG. 6 is a meridian cross-sectional view illustrating the main parts of a pneumatic tire according to another embodiment of the present technology.

In the case of a pneumatic tire having a tire ground contact width TCW in a range from 110 mm to 170 mm (see FIG. 6), the circumferential grooves 21 disposed in the region in the tire width direction in which the sound-absorbing member 6 is disposed preferably include four main grooves (21e) having a width of at least 4 mm. This allows for the effective reduction of air column resonance caused by the circumferential grooves 21 while maintaining satisfactory wet performance.

The widest circumferential groove 21 out of the circumferential grooves 21 disposed in the region in the tire width direction in which the sound-absorbing member 6 is disposed preferably has a width of at least 15 mm. Forming a circumferential groove 21 having a width of at least 15 mm in the tread portion 1 in this manner allows for enhanced wet performance. It is especially preferable for the widest circumferential groove 21 to have a width of at least 17 mm.

Because the sound-absorbing member 6 is imparted with a comparatively large width W in the pneumatic tire described above, shear strain readily occurs in the bonded surface of the sound-absorbing member 6 as the result of deformation of the tread portion 1. It is therefore necessary to ensure that the sound-absorbing member 6 remains satisfactorily bonded to the tire inner surface 4. Therefore, it is preferable that the ends in the tire width direction of the sound-absorbing member 6 be disposed in all regions outside the areas X directly underneath the circumferential grooves 21, as illustrated in FIG. 2. The areas X directly underneath the circumferential grooves 21 are the regions between pairs of straight lines drawn orthogonal to the road contact surface of the tread portion 1 from the groove with reference points of the circumferential grooves 21 as seen in a tire meridian cross section.

By disposing the ends in the tire width direction of the sound-absorbing member 6 in regions outside the areas X directly beneath the circumferential grooves 21 as described above, it is possible to prevent the ends of the sound-absorbing member 6 from debonding from the tire inner surface 4 when a tire changer is used to remove the pneumatic tire from the wheel, even when the tread portion 1 exhibits pronounced bending at the circumferential grooves 21.

In the pneumatic tire described above, a land portion 22, rather than a circumferential groove 21, is disposed at the tire equatorial position; this yields the following effects. To wit, although the presence technology yields the effect of improving wet performance and quiet running ability, steering stability on dry road surfaces, which is a property antithetical to these properties, is greatly affected by whether a land portion or a circumferential groove is present at the tire equatorial position. Specifically, satisfactory steering stability on dry road surfaces is obtained when a land portion is present at the tire equatorial position. Therefore, it is preferable to dispose a land portion at the tire equatorial position in order to strike a balance between these opposing aspects of performance. When the circumferential groove is disposed at the tire equatorial position, there is a reduction in hoop effect at the tire equatorial position, with the result that the footprint tends to become rounded. When the footprint takes on a rounded shape, the ground contact length of the circumferential grooves will vary greatly depending upon their positions in the tread portion in the tire width direction, with the result that the frequency of the air column resonance produced by the circumferential grooves will be dispersed into multiple bandwidths, impeding the creation of a design that allows sound absorption effects to be yielded by the sound-absorbing member and the adhesive layer. From this point of view as well, it is preferable that a land portion 22 be disposed at the tire equatorial position.

In the pneumatic tire described above, it is preferable that a single sound-absorbing member 6 extend in the tire circumferential direction, the member being of uniform thickness at least within a range corresponding to the bonded surface of the sound-absorbing member 6 as seen in a cross-section orthogonal to the longitudinal direction thereof, and having a constant cross-sectional shape along its longitudinal direction. In particular, it is preferable that the sound-absorbing member 6 have a rectangular (including square) cross-sectional shape in a cross-section orthogonal to the longitudinal direction thereof; however, in some cases, an inverted trapezoid shape in which the bonded surface side is narrower in width may also be possible. This allows the volume of sound-absorbing member 6 per unit of adhesion area to be maximized, thereby yielding superior noise-reducing effects. In addition, a sound-absorbing member 6 having such a shape is easy to machine, thereby reducing manufacturing costs.

When the pneumatic tire described above is mounted on a rim, a cavity 7 is formed between the tire inner surface 4 and the rim; the volume of the sound-absorbing member 6 is preferably greater than 20% of the volume of the cavity 7. Increasing the volume of the sound-absorbing member 6 in this way allows superior noise-reducing effects to be obtained, and allows a satisfactory adhesive state to be maintained over long periods of time even when a large sound-absorbing member 6 is used. It is also preferable that the sound-absorbing member 6 not be annular-shaped.

It is preferable that the sound-absorbing member 6 have a hardness (DIS-K 6400-2) of 60 N to 170 N, and a tensile strength (JIS-K 6400-5) of 60 kPa to 180 kPa. Sound-absorbing member 6 having such physical properties will exhibit superior durability against shear strain. If the hardness or tensile strength of the sound-absorbing member 6 is too low, the durability of the sound-absorbing member 6 will be reduced. In particular, the hardness of the sound-absorbing member 6 is preferably from 70 N to 160 N, more preferably from 80 N to 140 N. The tensile strength of the sound-absorbing member 6 is preferably from 75 kPa to 165 kPa, more preferably from 90 kPa to 150 kPa.

It is preferable that in the adhesive layer 5 have a peel adhesive force (JIS-Z 0237:2009) in a range from 8 N/20 mm to 40 N/20 mm. This facilitates the processes of bonding the sound-absorbing member 6 and removing the member when the tire is being disposed of while maintaining satisfactory anchoring strength on the part of the sound-absorbing member 6. Specifically, if the peel force of the adhesive layer 5 is too low, the anchoring state of the sound-absorbing member 6 will become unstable; conversely, if the peel force of the adhesive layer 5 is too great, it will be difficult to alter the bonding position during the process of bonding the sound-absorbing member 6, and to remove the sound-absorbing member 6 when disposing of the tire. In particular, the peel adhesive force of the adhesive layer 5 is preferably from 9 N/20 mm to 30 N/20 mm, more preferably from 10 N/20 mm to 25 N/20 mm.

Figure 5:
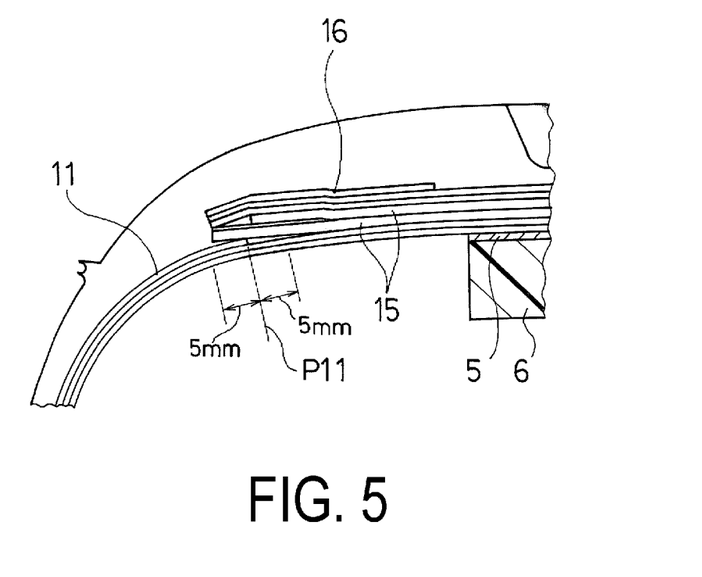
FIG. 5 is a cross-sectional view illustrating a shoulder portion of the pneumatic tire according to the present technology.

In the pneumatic tire described above, a tire structure in which a carcass layer 11 is mounted between the pair of bead portions 3, 3, a belt layer 15 is disposed to the outer circumferential side of the carcass layer 11 in the tread portion 1, the carcass layer 11 is folded from the tire inner side to the tire outer side around bead cores 12 disposed in each of the bead portions 3, and the folded back portion of the carcass layer 11 extends to a position overlapping the belt layer 15 is adopted, as illustrated in FIG. 2. If such a tire structure is adopted, it is preferable that the ends in the tire width direction of the sound-absorbing member 6 be disposed at positions at least 5 mm away from an end position P11 of the carcass layer 11, as illustrated in FIG. 5.

Hi-performance tires that emphasize steering stability use tire structures in which the folded back portions of the carcass layer 11 extend to positions overlapping the belt layer 15 in order to achieve both reduced weight and spring properties. However, such tire structures exhibit high levels of heat generation at locations where the ends of multiple tire components, including not only the carcass layer 11, but also the belt layer 15, belt cover layer 16, and the like, cluster, and such locations often are the cause of separation failure in durability testing. Therefore, positioning the ends in the tire width direction of the sound-absorbing member 6 at a sufficient distance from the end positions P11 of the carcass layer 11 allows the durability of the pneumatic tire to be improved.

EXAMPLES

Pneumatic tires of Comparative Examples 1 to 4 and Working Examples 1 to 5 each having a tire size of 275/35R20 provided with an annular-shaped tread portion extending in a tire circumferential direction, a pair of side wall portions disposed on both sides of the tread portion, and a pair of bead portions disposed on the inner side in a tire radial direction of the side wall portions, a plurality of circumferential grooves that extend in the tire circumferential direction being provided in the tread portion, and a belt-shaped sound-absorbing member being bonded via an adhesive layer to a tire inner surface in a region corresponding to the tread portion along the tire circumferential direction, and having a proportion (%) of the width of the sound-absorbing member to the tire ground contact width, a proportion (%) of the total width of the circumferential grooves included in the region in which the sound-absorbing member is disposed to the width of the sound-absorbing member, and a proportion (%) of the total width of the circumferential grooves included in the region in which the sound-absorbing member is disposed to the tire ground contact width as shown in Table 1 were prepared.

Comparative Examples 1 to 4 and Working Examples 1 to 5 shared the following characteristics. Tire ground contact width was 205 mm. 0.5 mm-thick double-sided adhesive tape was used for the adhesive layer. The ends in the tire width direction of the sound-absorbing member were disposed in regions outside the areas directly underneath the circumferential grooves. The sound-absorbing member had a rectangular cross-sectional shape as seen in a cross-section orthogonal to the longitudinal direction thereof, and the cross-sectional shape was constant along the tire circumferential direction. The volume of the sound-absorbing member was 25% of the volume of the cavity formed within the tire when mounted on a rim. The sound-absorbing member had a hardness of 91 N and a tensile strength of 132 kPa. The adhesive layer had a peel adhesive force of 16 N/20 mm.

The test tires were evaluated for cavernous resonance, wet performance, high-frequency road noise, and sound-absorbing member debonding according to the evaluation methods described hereafter; results are shown in Table 1.

Cavernous Resonance:

Each of the test tires was mounted on a wheel having a rim size of 20×9.5 J, installed on a test vehicle at an air pressure of 250 kPa, and driven at a speed of 80 km/h on a road noise measuring track (smooth asphalt track); the interior noise generated thereby was captured and measured by a microphone installed at ear level on the driver side window, and a partial overall value (dB (A)) for 200 Hz to 250 Hz was calculated. Evaluation results are shown in terms of the difference from Comparative Example 1. A smaller value indicates less cavernous resonance.

Wet Performance:

Each of the test tires was mounted on a wheel having a rim size of 20×9.5 J, installed on a test vehicle at an air pressure of 250 kPa, and subjected to a sensory evaluation by test drivers on a test course with a wet road surface (average of two evaluations each by five testers). Evaluation results were expressed as index values, Comparative Example 1 being assigned an index value of 100. A larger index value indicates superior wet performance.

High-Frequency Road Noise:

Each of the test tires was mounted on a wheel having a rim size of 20×9.5 J, installed on a test vehicle at an air pressure of 250 kPa, and driven at a speed of 80 km/h on a road noise measuring track (smooth asphalt track); the interior noise generated thereby was captured and measured by a microphone installed at ear level on the driver side window, and a partial overall value (dB (A)) for 800 Hz to 1.5 kHz was calculated. Evaluation results are shown in terms of the difference from Comparative Example 1. A smaller value indicates less high-frequency road noise.

Debonding of Sound-Absorbing Member:

Each of the test tires was mounted on a wheel having a rim size of 20×9.5 J, and subjected to a 100-hour running test on a drum tester at testing conditions of air pressure of 150 kPa, load of 6 kN, and speed of 150 km/h, after which the presence or lack of debonding on the part of the sound-absorbing member was visually confirmed. In order to obtain an index of debonding resistance, a running test was performed using a drum tester under similar conditions, the presence or lack of sound-absorbing member debonding was confirmed every 10 hours, and the running distance until the debonding occurred was measured. Debonding resistance evaluation results were expressed as index vales, Comparative Example 1 being assigned an index value of 100. Larger index values indicate superior debonding resistance.

TABLE 1

|  | Comparative Example 1 | Working Example 1 | Working Example 2 | Working Example 3 | Comparative Example 2 |
|---|---|---|---|---|---|
| Proportion (%) of width of sound-absorbing member to tire ground contact width | 65 | 75 | 85 | 95 | 98 |
| Proportion (%) of total circumferential groove width to width of sound-absorbing member | 30 | 30 | 28 | 25 | 25 |
| Proportion (%) of total circumferential groove width to tire ground contact width | 19.5 | 22.5 | 23.8 | 23.75 | 24.5 |
| Cavernous resonance (dB) | — | −0.3 dB | −0.4 dB | −0.5 dB | −0.5 dB |
| Wet performance (index) | 100 | 105 | 105 | 105 | 105 |
| High-frequency road noise (dB) | — | ±0 dB | ±0 dB | ±0 dB | ±0 dB |
| Presence of sound-absorbing member debonding | No | No | No | No | Yes |
| Debonding resistance | 100 | 100 | 100 | 98 | 85 |

|  | Comparative Example 3 | Working Example 4 | Working Example 5 | Comparative Example 4 |
|---|---|---|---|---|
| Proportion (%) of width of sound-absorbing member to tire ground contact width | 85 | 85 | 85 | 85 |
| Proportion (%) of total circumferential groove width to width of sound-absorbing member | 20 | 25 | 40 | 45 |
| Proportion (%) of total circumferential groove width to tire ground contact width | 17.0 | 21.25 | 34.0 | 38.25 |
| Cavernous resonance (dB) | −0.4 dB | −0.4 dB | −0.4 dB | −0.4 dB |
| Wet performance (index) | 95 | 105 | 115 | 120 |
| High-frequency road noise (dB) | −0.5 dB | ±0 dB | +0.3 dB | +0.6 dB |
| Presence of sound-absorbing member debonding | No | No | No | No |
| Debonding resistance | 100 | 100 | 100 | 100 |

As is apparent from Table 1, the tires of Working Examples 1 to 5 successfully yielded satisfactory results for cavernous resonance, wet performance, and high-frequency road noise (air column resonance caused by the circumferential grooves) compared to Comparative Example 1. Moreover, the tires of Working Examples 1 to 5 exhibited no debonding of the sound-absorbing member whatsoever following a 100-hour running test.

More specifically, as can be seen in Working Examples 1 to 3, increasing the proportion of the width of the sound-absorbing member to the tire ground contact width lead to an improvement in cavernous resonance reduction effects over Comparative Example 1. In addition, in Working Examples 1 to 3, increasing the total width of the circumferential grooves as the width of the sound-absorbing member was increased lead to increased wet performance, but no increase in high frequency road noise occurred even when the total width of the circumferential grooves was so increased. Meanwhile, the proportion of the width of the sound-absorbing member to the tire ground contact width was too great in Comparative Example 2, with the result that the debonding of the sound-absorbing member occurred following a 100-hour running test.

In Comparative Examples 3 and 4 and Working Examples 4 and 5, the total width of the circumferential grooves was altered while keeping the width of the sound-absorbing member constant; in Working Examples 4 and 5, this resulted in an improvement in wet performance while suppressing increases in high-frequency road noise. In the tire of Comparative Example 3, by contrast, the proportion of the total width of the circumferential grooves included in the region in which the sound-absorbing member is disposed to the width of the sound-absorbing member was too small, resulting in insufficient wet performance. In the tire of Comparative Example 4, the proportion of the total width of the circumferential grooves included in the region in which the sound-absorbing member is disposed to the width of the sound-absorbing member was too large, resulting in insufficient high-frequency road noise reduction effects.

Next, tires according to Working Examples 6 to 11 having structures identical to those of Working Example 1, except for having different sound-absorbing member hardness, sound-absorbing member tensile strength, adhesive layer peel adhesive force, and adhesive layer thickness, were prepared.

The tires according to Working Examples 6 to 11 were evaluated for cavernous resonance, wet performance, high-frequency road noise, and sound-absorbing member debonding according to evaluation methods like those described above. Results are shown in Table 2.

TABLE 2

|  | Working Example 6 | Working Example 7 | Working Example 8 |
|---|---|---|---|
| Proportion (%) of width of sound-absorbing member to tire ground contact width | 75 | 75 | 75 |
| Proportion (%) of total circumferential groove width to width of sound-absorbing member | 30 | 30 | 30 |
| Proportion (%) of total circumferential groove width to tire ground contact width | 22.5 | 22.5 | 22.5 |
| Sound-absorbing member hardness (N) | 60 | 170 | 91 |
| Sound-absorbing member tensile strength (kPa) | 60 | 180 | 132 |
| Adhesive layer peel adhesive force (N/20 mm) | 16 | 16 | 8 |
| Adhesive layer thickness (mm) | 0.5 | 0.5 | 0.5 |
| Cavernous resonance (dB) | −0.3 dB | −0.3 dB | −0.3 dB |
| Wet performance (index) | 100 | 100 | 100 |
| High-frequency road noise (dB) | −0.4 dB | −0.4 dB | −0.4 dB |
| Presence of sound-absorbing member debonding | No | No | No |
| Debonding resistance | 100 | 100 | 98 |

|  | Working Example 9 | Working Example 10 | Working Example 11 |
|---|---|---|---|
| Proportion (%) of width of sound-absorbing member to tire ground contact width | 75 | 75 | 75 |
| Proportion (%) of total circumferential groove width to width of sound-absorbing member | 30 | 30 | 30 |
| Proportion (%) of total circumferential groove width to tire ground contact width | 22.5 | 22.5 | 22.5 |
| Sound-absorbing member hardness (N) | 91 | 91 | 91 |
| Sound-absorbing member tensile strength (kPa) | 132 | 132 | 132 |
| Adhesive layer peel adhesive force (N/20 mm) | 40 | 16 | 16 |
| Adhesive layer thickness (mm) | 0.5 | 0.1 | 1.2 |
| Cavernous resonance (dB) | −0.3 dB | −0.3 dB | −0.3 dB |
| Wet performance (index) | 100 | 100 | 100 |
| High-frequency road noise (dB) | −0.4 dB | −0.2 dB | −0.6 dB |
| Presence of sound-absorbing member debonding | No | No | No |
| Debonding resistance | 110 | 100 | 98 |

As shown in Table 2, the tires of Working Examples 6 to 9, which had different sound-absorbing member hardnesses, sound-absorbing member tensile strengths, and adhesive layer thicknesses, successfully yielded satisfactory results for cavernous resonance, wet performance, and-high-frequency road noise, and exhibited no debonding of the sound-absorbing member whatsoever after a 100-hour running test, as in the case of Working Example 1. In addition, as is clear from a comparison of Working Example 1 and Working Examples 10 and 11, high-frequency road noise can be reduced while maintaining satisfactory debonding resistance by making an adhesive layer thickness appropriate.

The invention claimed is:

1. A pneumatic tire, comprising:
an annular-shaped tread portion extending in a tire circumferential direction;
a pair of side wall portions disposed on both sides of the tread portion; and
a pair of bead portions disposed to the inside of the side wall portions in a tire radial direction,
a plurality of circumferential grooves that extend in the tire circumferential direction being provided in the tread portion, and a belt-shaped sound-absorbing member being bonded via an adhesive layer to a tire inner surface in a region corresponding to the tread portion along the tire circumferential direction, the tire being characterized in that:
the sound-absorbing member has a width of 70% to 95% of a ground contact width of the tire, and the circumferential grooves included in a region in a tire width direction in which the sound-absorbing member is disposed have a total width of 25% to 40% of the width of the sound-absorbing member;
the sound-absorbing member has a tensile strength of 60 kPa to 110 kPa;
the adhesive layer is double-sided adhesive tape having a thickness of 0.1 mm to 1.2 mm; and
the sound-absorbing member is constituted by a single sound-absorbing member extending in the tire circumferential direction, the single member being of uniform thickness at least within a range corresponding to the bonded surface of the sound-absorbing member as seen in a cross-section orthogonal to the longitudinal direction thereof, and having a constant cross-sectional shape along its longitudinal direction.

2. The pneumatic tire according to claim 1, wherein the sound-absorbing member is disposed so that all of the circumferential grooves formed in the tread portion are included within the region in the tire width direction in which the sound-absorbing member is disposed.

3. The pneumatic tire according to claim 1, wherein the tire ground contact width is from 110 mm to 170 mm, and the circumferential grooves disposed in the region in the tire width direction in which the sound-absorbing member is disposed include four main grooves having a width of at least 4 mm.

4. The pneumatic tire according to claim 1, wherein the tire ground contact width is from 150 mm to 280 mm, and the circumferential grooves disposed in the region in the tire width direction in which the sound-absorbing member is disposed include three main grooves having a width of at least 10 mm and one or two auxiliary grooves having a width of less than 10 mm.

5. The pneumatic tire according to claim 1, wherein the widest circumferential grooves out of the circumferential grooves disposed in the region in the tire width direction in which the sound-absorbing member is disposed has a width of at least 15 mm.

6. The pneumatic tire according to claim 1, wherein ends in the tire width direction of the sound-absorbing member are disposed in regions outside areas directly beneath the circumferential grooves.

7. The pneumatic tire according to claim 1, wherein the volume of the sound-absorbing member is at least 21% of the volume of a cavity formed within the tire when mounted on a rim.

8. The pneumatic tire according to claim 1, wherein the sound-absorbing member has a hardness of 60 N to 170 N.

9. The pneumatic tire according to claim 1, wherein the adhesive layer has a peel adhesive force in a range from 8 N/20 mm to 40 N/20 mm.

10. The pneumatic tire according to claim 1, wherein a carcass layer is mounted between the pair of bead portions, a belt layer is disposed to the outer circumferential side of the carcass layer in the tread portion, the carcass layer is folded back from the tire inner side to the tire outer side around bead cores disposed in the bead portions, the folded back portion of the carcass layer extends to a position overlapping the belt layer, and the ends in the tire width direction of the sound-absorbing member are disposed at positions at least 5 mm away from the positions of the ends of the carcass layer.

11. The pneumatic tire according to claim 1, wherein the sound-absorbing member is constituted by a porous material containing interconnecting cells.

12. The pneumatic tire according to claim 11, wherein the porous material is polyurethane foam.

* * * * *